(12) United States Patent
Motylinski et al.

(10) Patent No.: US 12,113,854 B2
(45) Date of Patent: Oct. 8, 2024

(54) COMPUTER-IMPLEMENTED SYSTEM AND METHOD FOR UPDATING A NETWORK'S KNOWLEDGE OF THE NETWORK'S TOPOLOGY

(71) Applicant: nChain Licensing AG, Zug (CH)

(72) Inventors: Patrick Motylinski, London (GB); Stephane Vincent, Luxembourg (LU)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 18/232,815

(22) Filed: Aug. 10, 2023

(65) Prior Publication Data
US 2024/0039989 A1     Feb. 1, 2024

Related U.S. Application Data

(63) Continuation of application No. 17/359,081, filed on Jun. 25, 2021, now Pat. No. 11,778,021, which is a
(Continued)

(30) Foreign Application Priority Data

Jan. 31, 2017     (GB) ...................................... 1701592

(51) Int. Cl.
*H04L 67/1042*     (2022.01)
(52) U.S. Cl.
CPC ................................ *H04L 67/1042* (2013.01)
(58) Field of Classification Search
CPC . H04L 67/1042; H04L 9/3239; H04L 9/3297; H04L 9/50; H04L 63/00
See application file for complete search history.

(56) References Cited

U.S. PATENT DOCUMENTS

| 7,006,453 B1 | 2/2006 | Ahmed et al. |
| 7,580,711 B1 | 8/2009 | Kraiem et al. |

(Continued)

FOREIGN PATENT DOCUMENTS

| CN | 101374323 A | 2/2009 |
| CN | 102195857 A | 9/2011 |

(Continued)

OTHER PUBLICATIONS

Antonopoulos, "Mastering Bitcoin—Unlocking Digital Cryptocurrencies," O'Reilly Media, Inc., Dec. 20, 2014, 282 pages.
(Continued)

*Primary Examiner* — Benjamin M Thieu
(74) *Attorney, Agent, or Firm* — Davis Wright Tremaine LLP

(57) ABSTRACT

The computer implemented invention provides a method, corresponding systems and arrangement within a network for detecting changes in the topology, ordering those changes by occurrence and constructing a new topology reflecting the changes. The invention addresses problems with keeping the knowledge of the network topology at each network node current, particularly when the network topology is dynamic, i.e., when links fail and recover at arbitrary times. The topology updating is event driven, as it is activated when some change in the network, particularly with nodes and links occurs. Events cause topology changes to be reported to other nodes in the network. Timestamping of messages allows the messages to be correctly applied as the most recent update or discarded. An algorithm is provided that allows each merchant node to maintain a correct view of the network topology despite link and node failures.

19 Claims, 2 Drawing Sheets

Related U.S. Application Data continuation of application No. 16/482,229, filed as application No. PCT/IB2018/050515 on Jan. 29, 2018, now Pat. No. 11,050,821.

(56) References Cited

U.S. PATENT DOCUMENTS

| | | |
|---|---|---|
| 9,654,375 B1 | 5/2017 | Pani |
| 2004/0170151 A1 | 9/2004 | Habetha |
| 2005/0160179 A1 | 7/2005 | Retana et al. |
| 2008/0062862 A1 | 3/2008 | Goyal et al. |
| 2009/0196184 A1 | 8/2009 | Rajan et al. |
| 2011/0158085 A1 | 6/2011 | Aloush et al. |
| 2011/0295942 A1 | 12/2011 | Raghunath et al. |
| 2011/0317710 A1 | 12/2011 | Tessier et al. |
| 2012/0300783 A1 | 11/2012 | Chen et al. |
| 2013/0129345 A1 | 5/2013 | Meng et al. |
| 2014/0286344 A1 | 9/2014 | Skalecki et al. |
| 2015/0304205 A1 | 10/2015 | Yuan |
| 2016/0337470 A1 | 11/2016 | Hwang et al. |
| 2017/0364534 A1 | 12/2017 | Zhang et al. |
| 2018/0063238 A1 | 3/2018 | Zhang |

FOREIGN PATENT DOCUMENTS

| | | |
|---|---|---|
| EP | 0752795 A2 | 1/1997 |
| JP | H0936892 A | 2/1997 |
| JP | 2010016642 A | 1/2010 |

OTHER PUBLICATIONS

Cattani et al., "Group Monitoring in Mobile Wireless Sensor Networks", International Conference on Distributed Computing in Sensor Systems and Workshops (DCOSS), Jul. 2011, 8 pages.

International Search Report and Written Opinion mailed Apr. 30, 2018, Patent Application No. PCT/IB2018/050515, 14 pages.

Jin et al., "Dynamic Scheduling of Network Updates," ACM SIGCOMM Computer Communication Review 44(4):539-50, Aug. 17, 2014.

Nakamoto, "Bitcoin: A Peer-to-Peer Electronic Cash System," Bitcoin, Oct. 31, 2008, https://bitcoin.org/bitcoin.pdf, 9 pages.

Raynal et al., "Logical Time: Capturing Causality in Distributed Systems," Computer 29(2):49-56, Feb. 1996.

Satoshi et al., "Connection Limits," Bitcoin Forum, Aug. 9, 2010, https://bitcointalk.org/index.php?topic=741.0;prev_next=prev, 2 pages.

UK Commercial Search Report mailed Mar. 14, 2017, Patent Application No. 1701592.6, 5 pages.

UK IPO Search Report mailed Jul. 20, 2017, Patent Application No. 1701592.6, 3 pages.

COMPUTER-IMPLEMENTED SYSTEM AND METHOD FOR UPDATING A NETWORK'S KNOWLEDGE OF THE NETWORK'S TOPOLOGY

CROSS REFERENCE TO RELATED APPLICATIONS

This application is a continuation of U.S. patent application Ser. No. 17/359,081, filed Jun. 25, 2021, entitled "COMPUTER-IMPLEMENTED SYSTEM AND METHOD FOR UPDATING A NETWORK'S KNOWLEDGE OF THE NETWORK'S TOPOLOGY," which is a continuation of U.S. patent application of Ser. No. 16/482,229, filed Jul. 30, 2019, now U.S. Pat. No. 11,050,821, entitled "COMPUTER-IMPLEMENTED SYSTEM AND METHOD FOR UPDATING A NETWORK'S KNOWLEDGE OF THE NETWORK'S TOPOLOGY," which is a 371 Nationalization Patent Application of PCT/IB2018/050515, filed Jan. 29, 2018, entitled "COMPUTER-IMPLEMENTED SYSTEM AND METHOD FOR UPDATING A NETWORK'S KNOWLEDGE OF THE NETWORK'S TOPOLOGY," which claims priority to United Kingdom Patent Application No. 1701592.6, filed Jan. 31, 2017, the disclosures of with are incorporated herein by reference in their entirety.

FIELD OF INVENTION

This invention relates generally to system topology and methods of updating a system topology, and more particularly to changing peer-to-peer (P2P) system topologies and methods for updating a changing P2P system topology. The invention is particularly suited, but not limited, to distributed systems and methods using such distributed systems for implementing transactions and/or blockchain.

BACKGROUND OF INVENTION

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated." Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e., added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g., a permanent, tamper proof records of events, distributed processing, etc.) while being more versatile in their applications.

One area of current research is the use of the blockchain for the implementation of "smart contracts." These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

Various prior art methodologies are known for managing connections and routings within a network. Examples of such prior art methodologies are briefly described below.

US2014286344 relates to distributed connection establishment and restoration in a network. Connection constraints are flooded using an extension to a routing protocol being used to control forwarding on the network. Nodes maintain topology and a connection database and calculate routes for connections based on the constraints. If a node is on a calculated route for a connection it will install a forwarding state for the connection. Since each node has a consistent view of the network topology and has been provided with the constraints associated with the connection, each node on the network will calculate the same route for the connection. When a failure occurs, the nodes will calculate restoration paths for the connections on a network-wide priority basis to enable restoration paths to be created for the affected connections without requiring the restoration paths to be signaled. Time-stamps are used to allow events to be applied by nodes in a consistent order regardless of the order in which they arrive.

EP0752795 relates to link reservation in communications networks. A distributed means is described for setting up, taking down, and updating connections in a communications network, which is robust in the presence of failures. More specifically, a path for a connection is computed and reservation requests are simultaneously sent through separate channels to each of a set of nodes of the path for the connection to reserve and determine if resources are available for the connection. Upon acknowledgement that the links for the connection are available and have been reserved, a setup message is sequentially transmitted between the adjacent nodes along the path until the setup messages reaches the destination node. The switches in each node then configure themselves in response to the setup message so as to establish the connection.

US2004170151 relates to a dynamic network and routing method for a dynamic network. A dynamic network with a plurality of nodes is described in which it is provided that routing information is stored in local routing tables in nodes of the network. The nodes send an update request to other nodes for updating the local routing tables and the addressed nodes send an update response with updated routing information to the requesting nodes.

SUMMARY OF INVENTION

An issue with system topology is ensuring that the system is maintained in an effective and fast functioning state when topology changes occur, for instance due to new nodes or peers joining the system and/or due to nodes or peers leaving and returning to an operative state.

Thus, it is desirable to provide a solution which includes amongst its potential aims a system topology and/or method of updating a system topology in which changes in topology are detected effectively and/or rapidly.

Thus, it is desirable to provide a solution which includes amongst its potential aims a system topology and/or method of updating a system topology in which changes in topology are communicated effectively and/or rapidly within the system.

Thus, it is desirable to provide a solution which includes amongst its potential aims a system topology and/or method of updating a system topology in which changes in topology are updated throughout the network consistently and/or effectively and/or rapidly.

Such an improved solution has now been devised. The present invention is defined in the appended claims and/or in the statements of invention.

According to a first aspect of the invention there is provided a method of updating a network's knowledge of the network's topology, the method including:
a) a topology data set incorporating a change in the topology of a network being received by a first node in the network, the topology data set being associated with a time indication;
b) the first node having a topology data set associated with a time indication: wherein, if the time indication for the topology data set received by the first node is more recent than the time indication for the first node's topology data set, that the first node's topology data set is updated by the topology data set received by the first node.

The method may further provide, particularly after step b), that the first node sends to the network any updated first node topology data set. More preferably the method may further provide, particularly after step b), that the first node sends to the network the updated first node topology data set when the second node topology data set results in an update to the first node topology data set.

The method may provide that the first node has adjacent nodes, the adjacent nodes being those nodes within a given adjacency measure of the first node, and may provide that the first node has neighbour nodes, the neighbour nodes being those outside of the given adjacency measure of the first node and within a given neighbour measure of the first node. The method may further provide that the first node sends the updated first node topology data set to adjacent nodes and neighbour nodes only.

The time indication associated with the topology data set received by the first node is generated by the node from which the topology data set was provided. The time indication may be a timestamp associated with the topology data set by the node from which the topology data set was provided. The time indication may be a time indication of the time of detection of the change in the network by the second node, or more preferably the time of sending of the change in the network to the first node by the second node. The time indication may be provided by a time vector clock of the node providing the topology data set.

The method may further provide that the first node's topology data set is updated by one or more of:
a) changing the operational status for one or more links between nodes listed in the first node's topology data set;
b) adding one or more links between nodes not listed in the first node's topology data set;
c) removing one or more links between nodes listed in the first node's topology data set.

The method may further provide that it is a condition of the first node's topology data being updated that the topology data set received from a node in the network contains one or more links not in the first node's topology data set. The method may still further provide that it is a further condition that the first node's topology data set is only updated with respect to such links in the topology data set received from a node in the network which are within a given measure of the node.

The method may further provide that topology data set incorporating a change in the topology of the network is provided due to detection of an event in the network by a second node in the network. The event may be detected by the cessation of a message sent by a node in the network to the second node. The detection of the event may produce a change in the topology data set of the second node. The change in the topology data set of the second node may provide for the second node sending the change in the topology data set to at least the first node in the network.

The method may further, preferably between steps a) and b), ordering multiple topology data sets according to their respective time indications. One of the multiple topology data sets may be the first node's topology data set, with another one of the multiple topology data sets potentially being the second node's topology data set. One of the multiple topology data sets may be a topology data set from a third node, preferably with others of the multiple topology data sets being from further nodes. The ordering may establish which of the multiple topology data sets is the most recent of the multiple topology data sets.

The method may further provide that the most recent of the multiple topology data sets is used to update the first node's topology data set. The method may further provide that the topology data sets not associated with the most recent time indication are not used or are discarded.

The updated first node's topology data set may replace the prior first node's topology data set.

The method of updating a network's knowledge of the network's topology may further be a method of optimising connectivity within the network and/or optimising consistent data distribution within the network.

According to a second aspect of the invention there is provided a computer implemented system arranged to perform the method of the first aspect of the invention, potentially including a system arranged to perform any of the features, options and possibilities set out elsewhere within this document.

The computer implemented system may include a detector for the detection of changes in the topology of the network. The detector may detect changes effecting one or more nodes and/or one or more links. The detector may detect a change or changes in state, for instance from a first state to a second state and/or from a second state to a first state and/or may include one or more other states.

The computer implemented system may include update sorter for sorting updated topology data sets communicated within the network, particularly with respect to messages containing updated topology data sets. An update sorter may be provided such that messages are considered in the correct sequence or order or time of generation.

The computer implemented system may include a topology data set processor for processing of topology data sets, such that topology data sets are updated by topology date sets from other nodes in the network.

The computer implemented system may include a topology update communicator for updated topology data sets such that knowledge of changes in the topology of the network are shared within the network. A topology data set processor may provide the updating of a node's topology data set according to data from the topology data sets of further nodes.

According to a third aspect of the invention there is provided an arrangement within a network of nodes for updating the network with respect to changes in the topology of the network, the arrangement including a detector for the detection of changes in the topology of the network; and/or an update sorter for sorting updated topology data sets communicated within the network; and/or a topology data set processor for processing of topology data sets; and/or a topology update communicator for updated topology data sets such that knowledge of changes in the topology of the network are shared within the network.

The detector may detect changes effecting one or more nodes and/or one or more links. The detector may detect a change or changes in state, for instance from a first state to a second state and/or from a second state to a first state and/or may include one or more other states.

The update sorter may be provided for messages containing updated topology data sets. An update sorter may be provided such that messages are considered in the correct sequence or order or time of generation.

The topology data set processor for processing of topology data sets may be for topology data sets that are updated by topology date sets from other nodes in the network.

The topology data set processor may provide the updating of a node's topology data set according to data from the topology data sets of further nodes.

Therefore, in accordance with the invention there may be provided or further provided options, possibilities and features from amongst the following.

The network may be a distributed system of nodes. The distributed system may include one or more nodes in the form of clients and/or servers and/or peers.

A node may be an active electronic device or data communication equipment. A node may particularly be a router and/or workstation and/or server and/or host computer. A node may be a location capable of creating and/or receiving and/or transmitting information, for instance within the network, such as to one or more other nodes.

One or more or all of the nodes may be peers. Two or more or all of the nodes may be equal participants in the network, for instance in terms of privileges or abilities or capabilities.

The nodes in the network may be deemed the set of nodes.

The nodes may be connected by one or more links. A node may be connected to another node by one or more links. One or more or all of the links may be edges.

The distance between two nodes may be the sum of the links between those nodes, preferably the smallest number of links providing the connection between those nodes. The distance may be the hop. The distance may be the number of links, for instance such that directly linked nodes have a hop of value 1 and/or indirectly linked nodes have a hop of value>/=2. The distance or hop may be defined as:

$$d(i,j)$$

where d is the distance between node i and node j.

A node may be directly connected to another node when a limited number of links, preferably a single link, provides the connection. A node may be directly connected to one or more other nodes. Preferably a node connected directly to a node is connected to a node which is deemed an adjacent node. Preferably all of the other nodes connected directly to a node are adjacent nodes to that node. The adjacent nodes may be defined as:

$$adj(i)=\{j\in V: d(i,j)=r_{adj}\}$$

where i is the node under consideration, j is the number of adjacent nodes within set of nodes V, and $r_{adj}$ is the given adjacency measure.

The given adjacency measure may be an adjacency radius. The given adjacency measure may be a number of links, for instance 1 link.

A node may be indirectly connected to a further node when a number of links greater than 1 link provides the connection. Preferably a node is indirectly connected to a further node when it is connected to the further node via one or more intermediate nodes, such as an adjacent node and/or further nodes, or when it is connected to the further node via two or more links in series. A node may be indirectly connected to one or more or all of the further nodes in the network. Preferably the further nodes within a given neighbour measure of the node, which are not adjacent nodes, are neighbour nodes to that node. The further nodes outside of a given neighbour measure of the node are preferably neither adjacent nodes nor neighbour nodes. The further nodes outside of a given neighbour measure of the node and neither adjacent nodes nor neighbour nodes are preferably still part of the set of nodes. The neighbour nodes may be defined as:

$$N(i)=\{j\in V: d(i,j)=H, adj(i)\subseteq N(i)\}$$

where i is the node under consideration, j is the number of neighbour nodes within set V within distance d(i,j) is the distance between node i and node j, adj(i) is the adjacent nodes for node i, and H is the given neighbour measure.

The given neighbour measure may be a neighbour radius. The given neighbour measure may have a lower value and an upper value. The given neighbour measure may be a number of links, for instance with a common lower and upper value such as 2 links. The given neighbour measure is preferably larger than the given adjacency measure.

A node may part of a set of nodes, have one or more adjacent nodes and one or more neighbour nodes. Another node from within the set of nodes may have one or more or all adjacent nodes in common with the node or may have no adjacent nodes in common with the node. The another node may have one or more or all neighbour nodes in common with the node or may have no neighbour nodes in common with the node.

A detector for and/or detection of changes in the topology of the network may be provided. A detector for and/or detection of changes effecting one or more nodes and/or one or more links may be provided. The change or changes may be a change in state, for instance from a first state to a second state and/or from a second state to a first state and/or may include one or more other states.

A node may have a first state and a second state, the second state representing a change in a characteristic compared with the first state. The change in characteristic may be the node joining the set of nodes and/or the network. The change in characteristic may be the node re-joining the set of nodes and/or network. The change in characteristic may be the node starting to function or re-starting to function as a node in the set of nodes and/or network The change in characteristic may be the node leaving the set of nodes and/or network. The change in characteristic may be the node ceasing to function as a node in the set of nodes and/or network.

Preferably the link between a node and a further node directly connected to the node has a first state and a second state, the second state representing a characteristic change compared with the first state. The characteristic change may be the appearance of the link or access to the link. The characteristic change may be the re-appearance of the link or renewed access to the link. The characteristic change may be the disappearance of the link or loss of access to the link.

The characteristic change may be detected directly. Preferably the change in characteristic is detected indirectly, for instance using a test message. The test message may be sent by one node to the other node. The test message may be sent along a link. The test message is preferably sent repeatedly, preferably regularly. The test message may be sent at least once within a given time period and preferably at least once within any given repeat of that time period. The time period may be governed by a clock function in or associated with the node.

The lack of receipt of the test message by the node from the other node may indicate that the other node and/or the link there between has undergone a characteristic change. In particular the lack of receipt may indicate that the other node has left the network and/or the link has disappeared. Preferably the lack of receipt indicates that the other node has stopped functioning and/or the link has stopped functioning. Preferably the lack of receipt is considered with respect to a period of time. Preferably the period of time is a period greater than the time period during which the test message is repeated. Each node may maintain a timer, preferably a separate one for each link, so as to define the period of time in which receipt of the test message is expected.

The detection of a change of state for a node may generate a change to the node's topology data set. The detection of a change from a first state to second state may generate a change to the node's topology data set. The detection of a change from a second state to first state may generate a change to the node's topology data set.

The detection of a change from a first state, where the first state is a node which is joined to the network or functioning and/or a link which is accessible or functioning, to second state, where the second state is a node which is not joined to the network or not functioning and/or a link which is not accessible or not functioning, may generate a change to the node's topology data set.

The change to the node's topology data set may be a change to the status for a node or a link. The change to the status may be a change from an active status or live status or connected status to an inactive status or dead status or disconnected status.

The change to the node's topology data set may be the deletion of a node from the topology data set. The change to the node's topology data set may be the deletion of a link from the topology data set.

The detection of a change from a second state, where the second state is a node which is not joined to the network or not functioning and/or a link which is not accessible or not functioning, to a first state, where the first state is a node which is joined to the network or functioning and/or a link which is accessible or functioning, may generate a change to the node's topology data set.

The change to the node's topology data set may be a change to the status for a node or a link. The change to the status may be a change from an inactive status or dead status or disconnected status to active status or live status or connected status.

The change to the node's topology data set may be the addition of a node to the topology data set. The change to the node's topology data set may be the addition of a link to the topology data set.

The node's topology data set may be a topology table. The node's topology data set may be an imperfect data set compared with the complete data set possible for the node.

A node's topology data set, for instance a topology table, may comprise a list of the links known to that node at that time. A topology table may comprise a list of one or more or all of the possible links between that node and one or more, preferably all, of a selection of nodes for that node. The selection of nodes for that node may be one or more, preferably all, of the adjacent nodes for that node and/or one or more, preferably all, of the neighbour nodes for that node. The topology table may include a status for one or more, preferably all, of the links known to the node at that time.

When there is a change in the node's topology data set, the change in the node's topology data set may be communicated to one or more other nodes. When there is a change in the node's topology data set, preferably the entire node's topology data set may be communicated to one or more other nodes. The one or more other nodes may include one or more or all adjacent nodes. The one or more other nodes may include one or more or all neighbour nodes. The one or more other nodes may include one or more of all of the nodes in a set of nodes.

When another node receives a node's topology data set, the other node preferable evaluates whether the other node updates the other node's present topology data set with the node's topology data set or not. The evaluation may be performed by each another node receiving the node's topology data set, preferably with each evaluation being independent of the other evaluations. The evaluation may preferably establishes whether the other node's present topology data set is older or newer than the node's topology data set. Preferably where the other node's present data set is older, then the another node's present topology data set is updated from the node's topology data set. Preferably where the other node's present topology data set is newer, then the another node's present topology data set is not updated from the node's topology data set.

When the node receives another node's topology data set, the node preferable evaluates whether the node updates the node's present topology data set with the other node's topology data set or not. The evaluation may preferably establishes whether the node's present topology data set is older or newer than the other node's topology data set. Preferably where the node's present topology data set is older, then the node's present topology data set is updated from the other node's topology data set. Preferably where the node's present data set is newer, then the node's present topology data set is not updated from the other node's topology data set.

A message sorter for and/or message sorting of messages communicated within the network may be provided, particularly with respect to messages relating to changes in the topology of the network. A message sorter for and/or message sorting of messages may be provided such that messages are considered in the correct sequence or order or time of generation.

The node and another node may be provided with a clock function, such as a logical clock. The clock function may provide two data structures with a first being a record of local time and the second being a record of best known global time within the distributed system. For instance, a logical clock may provide a record of the local time through the clock function, for instance logical local time, and a local record of global time within the distributed system, such as logical global time.

Preferably each node in the system is provided with a clock function.

The clock function may assign a timestamp to one or more or all events in the system. An event may include the detection of a new node or new link. An event may include the detection of a change in status for a node or a link. An event may include the detection of the loss of a node or link. An event may include the node updating the node's topology data set.

The timestamps within the system preferably follow a monotonic property, most preferably increasing. Where two events are causally linked, then the effect event may be given a timestamp which is later than the cause event that lead to the effect event. The clock function may be a vector time clock. The vector time clock may use time vectors. Each node may operate a separate time vector. Each node may use the time vector for that node to timestamp events for that node. Each time vector may be of form:

$$T_i=(T_{i1},\ldots,T_{in})$$

where $T_i$ is the local logical clock of node i and describes the logical time progress of node i from time 1 through to time n.

One or more and preferably all of the nodes have at least partial knowledge of the logical time progress for one or more or all nodes, particularly the adjacent nodes and/or the neighbour nodes for that node. The at least partial knowledge of the logical time progress for another node may be of the form: $T_{ij}$ where represents node i's latest knowledge of node j's local time, where $j \in adj(i)$. The dimension of $T_i$ may be denoted by $dim(T_i)$, and $dim(T_i)$ may be equal to the size of $adj(i)$.

The time vector clock may operate according to one or more rules. The rules may include one or more or all of the following:
1. One or more and preferably all of the nodes start with a local time of 0;
2. When an event occurs at a node the local time may be increase, for instance by an integer, preferably by the value 1;
3. When an event occurs at a node that node sends a message to one or more further nodes, preferably that the topology data set has changed;
4. When a further node receives a message, preferably of a change, that is deemed an event for that node, preferably therefore rule 2 is applied to the further node local time;
5. When a further node receives a message, preferably of a change, the further node local time is further increased in addition to the increase of rule 4, preferably the further node local time is further increased by the greater of the further node's local time after the increase of rule 4 or the further node's local time in the message;
6. A message sent by a node to a further node includes a local time for the node and all further nodes for which the node has knowledge of a local time, that local time may be different to the actual local time one or more further nodes at that time;
7. Where a message is newer than the last message received by a node, the topology data set of the message may be used to update the topology data set of the further node, preferably rule 4 and/or 5 is only applied where the message is newer and/or the message results in the topology data set of the further node being updated;
8. Where a message is older than the last message received by a node, the topology data set of the message may be discarded and/or not used to update the topology data set of the further node, preferably rule 4 and/or 5 the message is older and/or is not applied where the topology data set of the message is discarded and/or not used;

The vector time clock may operate according to one or more rules, where the rules include one or more or all of:
The time stamp of the initial local event on a node i is all 0's except for the $i^{th}$ entry which is 1;
If $T_{ij}=x$, node i knows that the local time at node j has progressed up to x;
The vector $T_i$ constitutes a node i's view of the logical global time;
Node i uses it to timestamp events;
The timestamp of a message is the element-wise max of the current timestamp and the incoming vector time stamp;
Before sending a message, node i updates its local time $T_{ii} \leftarrow T_{ii}+1$;
Upon receiving a message (m, $T_j$) from node $j \in adj(i)$, node i executes the action of updating node i's logical global time by: $\forall k \in adj(i)$, $$T_{ik} \leftarrow \max(T_{ik}, T_{jk}).$$

The broadcast algorithm for the one or more or all messages sent by one or more or all nodes may be a deterministic algorithm or a probabilistic algorithm.

A data set processor and/or processing of a data set may be provided such that knowledge of changes in the topology of the network is shared within the network. A data set processor and/or processing of a data set for a node's topology data set may be provided such that the node's topology data set is updated by data from the topology data set of further nodes.

A node's topology data set, for instance a topology table, may be constructed for a node, preferably each node. The node's topology data set may comprise the main topology view $V_i$ for that node i. A node's topology data set may include a list of links known to the node. The links may be listed in the form $1_{mn}$ where m is one node and n is another node. The form $1_{mn}$ and $1_{nm}$ may be used interchangeable with only one of those pairs being listed to provide the link in the list. T node's topology data set may include a designation for each link in the list. The designation may have one of two values, for instance 1 or ∞. The designation may relate to the operational status of the link, for instance a value when operational and a value when not operational.

Initially the list of links known to the node may be those nodes and hence links which are detected by the node, for instance due to the receipt of test messages from further nodes via those links.

Once messages containing further node's topology data sets are exchanged then the list of links known to the node may be, or may be supplemented by, those links in the messages from other nodes. Preferably a combination of the links known to a node and those links in the messages from other nodes form the node's topology data set.

A node's topology data set may be updated with respect to changes in operational status for a node or a link. A node's topology data set may be updated with respect to a node or link returning to operational status. A node's topology data set may be updated with respect to a new link or a new node being added to the network. A new node being added to the network may be sent a node topology data set from another node so as to provide a first node topology data set for that node.

A node's topology data set may be updated with data from within a message containing a further node's topology data set when one or more conditions are met. A condition may be that the further node's topology data set has a late timestamp than the node's topology data set. A condition may be that the there is a change in the designation, for instance from 1 to ∞ or from ∞ to 1, in respect of one or more links, particularly one or more links in both the node's topology data set and the further node's topology data set. A condition may be that the further node's topology data set contains one or more links not in the node's topology data set. A condition may be that the further node's topology data set contains one or more links not in the node's topology data set, together with a further condition that the node's topology data set is only updated with respect to such links in the further node topology data set which are within a given measure of the node. The given measure may be within the given adjacency measure or more preferably within the given neighbour measure. Links which are not within the given measure are preferably not added to the node's topology data set.

A node's topology data set may be updated upon receiving a message, m, of form m={$V_j,T_j$} from node j at a given time $T_j$, with node j having a topology data set or global topology view Vj, such that node i uses it to update node i's topology data set or global topology view $V_i$.

A node's topology data set may be updated where link $1_{mn}$ is a link in both the node's topology data set, for instance node global view $V_i$, and in the further node's topology data set, for instance further node global view $V_j$, such that $V_i \cup V_j$. A node's topology data set being updated with information about link $1_{mn}$ which is received in $V_j$, may be conditional on the time stamp $T_j[t_j]>T_i[t_j]$, with the newer status for link $1_{mn}$ being taken if the condition is true.

A node's topology data set may be updated where a link $1_{pq}$ is a link in the further node's topology data set, for instance further node global view $V_j$, that is not presently a link in the node's topology data set, for instance node global view $V_i$. The information about link $1_{pq}$ being added to the node's topology data set, for instance node global view V, may be conditional on the distance between the nodes i and q being lower than the value for the adjacent nodes, horizon H. The condition may be that $1_{ij}+1_{jp_1}+1_{p_1p_2}+ \ldots +1_{p_np}+1_{pq}$<H where $1_{ij}, 1_{jp_1}, 1_{p_1p_2}, \ldots, 1_{p_np}$ are every active links of $V_i$.

A node may send a message containing the node's topology data set to one or more further nodes whenever a change is made to the node's topology data set as a result of a message received by the node. Preferably a node may send a message containing the node's topology data set to only those one or more further nodes that are neighbour nodes and/or adjacent nodes.

A node may send a message containing the node's topology data set to one or more new nodes whenever the node is linked to the new node. Preferably a node may send a message containing the node's topology data set to only those one or more new nodes that are adjacent nodes to the node.

Multiple nodes within the system and/or the method may initiate an update independently of each other. Multiple updates may be active within the system and/or method at the same time, preferably with the timestamp controlling with updates are applied to the topology data set at which nodes.

BRIEF SUMMARY OF THE DRAWINGS

These and other aspects of the present invention will be apparent from and elucidated with reference to, the embodiment described herein. An embodiment of the present invention will now be described, by way of example only, and with reference to the accompany drawings, in which.

DETAILED DESCRIPTION

Figure 1:
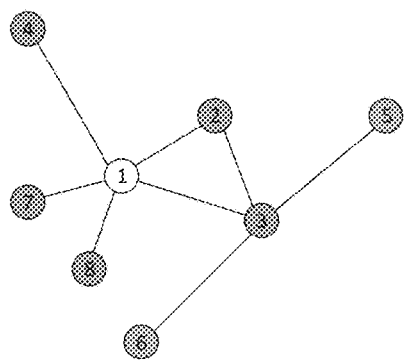
FIG. 1 is an example of a network topology diagram illustrating nodes, adjacent nodes and neighbouring nodes.

A central problem for unstructured peer-to-peer (P2P) networks is topology maintenance. For instance, how to properly update neighbour variables when nodes join and leave the network and/or when nodes crash abruptly. The invention is concerned with a topology update algorithm.

Within P2P networks, there is a need for searching, information dissemination, broadcasting and the like need to know "who is connected to whom" or "who knows whom." In this context a number of broadcast algorithms are known, such as probabilistic algorithms and deterministic algorithms.

Epidemiological Algorithms or Gossip Protocols are probabilistic in nature and they do not rely on fixed topologies. Nodes exchange information with random neighbours to implement a diffusion-like computation pattern, and as a result the system converges to a state where all the nodes know the message. Gossip protocols are scalable because each node sends only a fixed number of messages, independent of the number of nodes in the network. In addition, a node does not wait for acknowledgments nor does it take some recovery action should an acknowledgment not arrive. They achieve fault-tolerance against intermittent link failures and node crashes because a node receives copies of a message from different nodes. No node has a specific role to play, and so failed node will not prevent other nodes from continuing sending messages. Hence, there is no need for failure detection or specific recovery actions.

A drawback of gossip protocols is the number of messages that they send. One class of gossip protocols (anti-entropy protocols) send an unbounded number of messages in nonterminating runs.

Spanning Tree Algorithms such as breadth-first search are a class of deterministic algorithms. Spanning trees provide a simple way to visualize networks as "backbones," i.e., a minimal set of edges that connect nodes. The idea is simple; a spanning tree is first constructed and used to collect local data variables from each node, and then aggregate the data towards the root node (or sink node). Each node transmits its value to its own parent. At each non-leaf node, the value of its child nodes, in addition to its own value, is processed before transmitting the result up the tree. Since breadth-first protocol does not generate a node in the tree until all the nodes at shallower levels have been generated, it always finds a shortest path to a node. Spanning tress are a very efficient form of information distribution and collection, and in how they calculate the new topology of the network.

In general, structures like spanning trees are considered structurally fragile: single vertex or edge failure causes the broadcast to fail.

The topology-update problem is the problem of keeping the knowledge of the network topology at each network site current, when the network topology is dynamic, i.e., when links fail and recover at arbitrary times. The correct operation of any topology algorithm depends strongly on the way in which links status changes (failures and repairs) are detected by the network nodes and other factors.

There are several subtleties in the challenges that underlay the use of topology algorithms and which should be accounted for in any solution:

- A link may experience several topology changes within a short time. Other network nodes must eventually determine which changes was the most recent. Nodes must be able to distinguish between old and new information about the status of a link.
- While a topology algorithm is running, additional topology changes may occur. The topology algorithm must be capable of either incorporating new information during execution, or of starting a new algorithm version. If different versions are used, each node must be able to determine which is the most recent version.
- The repair of a single link can cause two parts of the network which were disconnected to reconnect. Each part may have out-of-date topology information about the other. The algorithm must ensure that the two parts eventually agree, and adapt the correct network topology.
- The ability for a network to realise changes within itself is important for fast and effective communication through the network and for the network to function fully. As an example, in order to provide a fast payment network for digital currencies, the transactions and other information must be shared through the distributed network completely and quickly.

In a method which relies on threshold cryptosystems to protect secrets by distributing shares to participants, a network consisting of a set of merchants who collectively hold a subset of the secret shares is first constructed. The second half of the secret share is held by the customer(s). The merchant network performs important tasks, such as creating signatures, updating key shares, defining the threshold level, validating transactions etc. Their ability to collaborate and communicate, and to be aware of the network topology is essential in these situations.

In the following description, we present an algorithm that allows each merchant node to maintain a correct view of the network topology despite link and node failures. The algorithm allows the network to automatically return to a stable configuration within a finite number of steps (so called "self-stabilisation") and uses logical clocks to accurately capture the causality relation between events. The topology updating protocol is event driven, i.e., it is activated when some change is detected.

The system includes steps for:
detecting changes in the topology;
ordering those changes by occurrence; and
constructing a new topology reflecting the changes.

To enable a full description of the invention, it is useful to understand a mathematical model of a network.

Referring to FIG. 1, a series of nodes (labelled 1 to 8) are provided. Each of the nodes is provided with a link (or edge) to another node. The series of nodes form a set, where V is the number of nodes in the set.

The network can be represented by a graph G=(V,E) where V is the set of nodes, each having a distinct identity, and E is the set of edges (or links).

The mathematical model uses the following definitions:

Definition 1. (A definition of "Hop") The distance $d(i,j)$ between two nodes i and j is equal to the minimum number of links connecting the nodes. Thus in FIG. 1, the distance between node 6 and node 1 is two links and in the case of node 8 and node 1 just one link.

Definition 2. (A definition of "Adjacent Nodes) The adjacent nodes, $adj(i)$, for node i in set V, $i \in V$, are nodes j in set V, $j \in V$, within defined distance or adjacent radius $r_{adj}$. Hence:

$$adj(i)=\{j \in V: d(i,j)=r_{adj}\}$$

Definition 3. (A definition of "Neighbour Nodes") The neighbour nodes, $N(i)$, for node i in set V, $i \in V$, are nodes j in set V, $j \in V$, within defined distance or horizon radius $H \geq r_{adj}$. Hence:

$$N(i)=\{j \in V: d(i,j)=H, adj(i) \subseteq N(i)\}$$

In FIG. 1, if we chose adjacent radius, $r_{adj}=1$, then the adjacent nodes to node (peer) 1 are represented in red; namely nodes 2, 3, 4, 7, 8. If we chose the horizon radius H=2, then the neighbour nodes are represented in blue; namely nodes 5 and 6.

Detecting Changes

Clearly to be able to account for a topological change, there is a need to be able to detect such a change.

Topological changes may occur at any time. Thus, we make the following assumptions about the system to capture any kind of initial faults. Each node i in the network maintains the identities of its adjacent neighbours in a list, $adj(i)$. Node i periodically sends a test messages "I'm alive" to its adjacent nodes. Referring to FIG. 1, node 4 would send such messages to node 1 only, whereas node 1 would send such messages to nodes 2, 3, 4, 7, 8.

The frequency of the dispatch of "I'm alive" messages has a large impact on the efficiency of the error detection mechanism. To achieve a short error detection time, the "I'm alive" messages have to be sent and checked very frequently.

Each processor in a node i has a local clock that is used to measure time intervals. The clocks at different nodes may not be synchronized with each other. For each link (i,j), node i maintains a timer $t_{ij}$ for its adjacent nodes $j \in adj(i)$. If node i does not receive the "I'm alive" message from node j within a time interval δt, it assumes that the link (i,j) is no longer available and removes j from its adjacent node set. It then updates its current (possibly wrong) topology table $T^i$. A topology table is a list of the operational status of the links that are directly connected to node i. Thus referring to FIG. 1, node 1 sends an "I'm alive" message to node 4 and node 4 should send an "I'm alive" message to node 1. If node 1 does not received such message from node 4 in the defined time period, then node 4 is removed from the topology table $T^1$ for node 1. Then the adjacent nodes for node 1 in topology table $T^1$ would be nodes 2, 3, 7 and 8 only.

The above consideration forms a first topology update rule, namely:

1. When a node detects that an adjacent link has failed, the failed status is entered in the node's main topology table.

It is desirable to share this updated topology table with other nodes in the set of nodes, V. When this occurs, a node updates its own topology table according to the topology table received from the adjacent node. Hence, a second topology update rule is formed, namely:

2. When a node receives an entire main topology table from a neighbour, it updates its main topology table by using the main topology update algorithm (described below).

Ordering Changes

As noted above, updated topology table messages are only sent in response to topological change that has been detected. Since all messages sent in the network are subject to delay, a node can never be certain that it knows the correct topology at some instant of time. One or more of the updated topology table messages may be older and out of date compared with the status noted in another updated topology message, irrespective of its time of reception. Causal ordering broadcast (as detailed in Raynal, M., and Singhal, M.,—Capturing Causality in Distributed Systems—1996 IEEE), ensures that if two messages are causally related and have the same destinations, they are delivered to the application in their sending order.

The invention uses a system of logical clocks, where every node (peer) has a logical clock that is advanced using a set of rules described below. As a result, every message is assigned a timestamp, by which a process can infer the causality relation between events. The timestamps assigned to events obey a monotonicity property; they are always increasing. That is, if an event a causally effects an event b, the timestamp of a is smaller than the timestamp of b. Event b is the effect of event a in that case.

The logical clock advances according to the following rules; vector time clocks.

In a system of vector clocks, the time domain is represented by a set of finite-dimensional, non-negative integer vectors. Each node i maintains a vector $T_i = (T_{i1}, \ldots, T_{in})$ where $T_{ii}$ is the local logical clock of node i and describes the logical time progress of node i from time 1 through to time n.

$T_{ij}$ represents node i's latest knowledge of node j's local time where node $j \in adj(i)$.

We denote the dimension of $T_i$ by $dim(T_i)$, and we have $dim(T_i)$ equal to the size of $adj(i)$.

The time stamp of an initial local event on node i is all 0's except for the $i^{th}$ entry, which is 1. If $T_{ij} = x$, node i knows that the local time at node j has progressed up to x. The vector $T_i$ constitutes node i's view of the logical global time; node i uses it to timestamp events. The time stamp of a received message is the element-wise max of the current stamp and the incoming vector time stamp.

Figure 2:
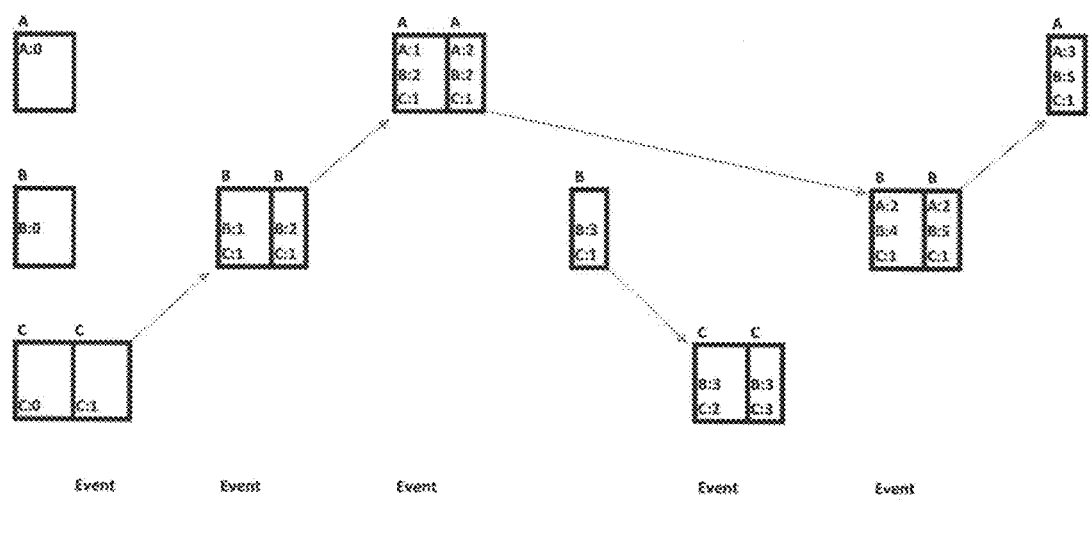
FIG. 2 is an illustration of a system of vector clocks.

This operation is illustrated in FIG. 2 in relation to three nodes, A, B and C. At each node, local time is initially 0. When an event occurs at node C, then node C increases its local clock time to 1 and notifies node B. When node B receives the message, no other events have been notified to node B and so the node B local time is still 0. Node B has now experienced an event and so node B updates the node B local time by 1. As the node B local time was 0 this gives a value of 1. In addition, Node B also amends the node B local time by adding the greater of the updated node B local time (value now 1) or the node B local time in the message (value 0 in the example). Hence, the amended node B local time is 2 and node B then notifies node A of the change.

Node A goes through a similar process of updating by 1 and amending by the addition of 1 to result in a message to node B of A:2 B:2 C:1. By the time node B receives this message, node B has noted another independent event and has communicated that to C. Thus there is an update of node B by 1, but the amendment is the addition of 1 to the node B local time (3 by this point) rather than the addition of 1 to the node B local time in the message (only 2 at this time). Hence the new message sent to A has a value of B:5 (3+1+1 and not 2+1+1).

Subsequent messages are dealt with in the same manner. The second message sent by node B at time 3 is independent of the other messages discussed above, message one (C to B), message two (B to A) and message four (A to B) and message five (B to C).

Figure 3:
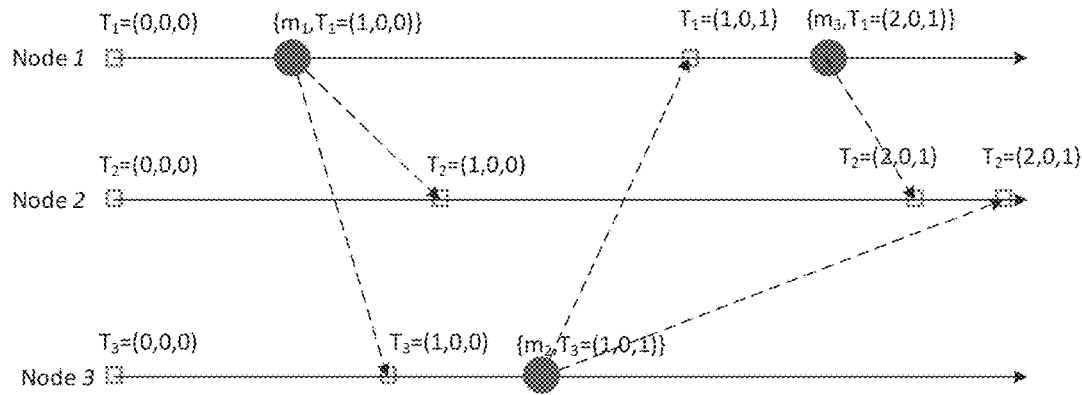
FIG. 3 depicts an execution of a broadcast algorithm, without the presence of any topology changes (failed or lost messages)

The above consideration forms the logical clock update rules, namely:

1. Before sending a message, node i updates its local logical time $T_{ii} \leftarrow T_{ii} + 1$.
2. Upon receiving a message $(m, T_j)$ from node $j \in adj(i)$, node i executes the following sequence of action
   a. Update its logical global time as follows: $\forall k \in adj(i)$, $T_{ik} \leftarrow \max(T_{ik}, T_{jk})$ FIG. 3 depicts an execution of the broadcast algorithm without any failed or lost message. We do not specify the broadcast algorithm (deterministic or probabilistic) and we do not provide a definition for neighbour nodes. We assume that nodes 1, 2, and 3 are all adjacent nodes, i.e. $(2, 3) \in adj(1)$, $(1, 3) \in adj(2)$, and $(1, 2) \in adj(3)$. Node 1 generates first message $(m_1, T_1)$ sends it randomly or deterministically according to the chosen broadcast algorithm to nodes 2 and 3. Node 3, triggered by message $(m_1, T_1)$ from node 1 generates a new second message $(m_2, T_3)$ and sends that the nodes 1 and 2. Node 1, triggered by message $(m_2, T_3)$ from node 3 generates a new third message $(m_3, T_1)$ and sends that to nodes 2 and 3.

Significantly, by the time node 2 receives the second message $(m_2, T_3)$ from node 3, node 2 has already received $(m_3, T_1)$ from node 1. Node 2 knows the order of these messages from the methodology outlined above. Hence, node 2 discards the second message $(m_2, T_3)$ and makes use of the third message $(m_3, T_1)$ guaranteeing the integrity of the message contents.

Constructing the Updated Topography

Having detected changes and having ensured the correct ordering of those changes at nodes, the manner in which a node establishes the new topography is discussed below.

The following algorithm is used by each node i to construct its main topology view $V_i$. We refer to the single bidirectional link between nodes m and n as either $l_{mn}$ or $l_{nm}$. Each entry in the topology table $V_i$ is a link $l_{mn}$ or $l_{nm}$. Links can take on one of two values 1 or ∞. When a link is operational the value is set to 1. When the link is dead the value is set to ∞.

Upon receiving a message $m=\{V_j,T_j\}$ from node j at a given time, node i uses it to update its global view $V_i$.

Let link $l_{mn}$ be a link in both global views, $V_i \cup V_j$. The information about link $l_{mn}$ is updated due to the received $V_j$, if the time stamp $T_j[t_j]>T_i[t_j]$. The newer status for link $l_{mn}$ is taken.

Let $l_{pq}$ be a link in $V_j$ that is not presently a link in $V_i$. The information about link $l_{pq}$ is added to the global view $V_i$, if the distance between the nodes i and q is lower than the value for the adjacent nodes, horizon H. That is $l_{ij}+l_{jp_1}+l_{p_1p_2}+ \ldots +l_{p_np}+l_{pq}<H$ where $l_{ij}, l_{jp_1}, l_{p_1p_2}, \ldots, l_{p_np}$ are every active link of $V_i$.

Hence changes in a link's operational status are updated, links returning to operational status are added and new links appearing in the network are added. When a link returns to the network or a new link is added to the network, the topology algorithm ensures that it is provided with a copy of the up to date topology table.

The above consideration forms the communication rules, namely:

1. When a link status entry in a node's main topology table changes, a message containing the new topology table is sent to the neighbour nodes.
2. When the link protocol at a node detects that an adjacent link has become operational, the node transmits its entire main topology table over that link.

An example of suitable code for the protocol is:

```
1:  for every V_j received do
2:  begin
3:    if T_j [t_j] > T_i[t_j] then
4:    begin
5:      T_i [t_j] = T_j[t_j]
6:      for every link l_mn ∈ V_i ∪ V_j do
7:      begin
8:        V_i[l_mn] = V_j[l_mn]
9:      end
10:     for every link l_mn ∈ V_j and l_mn ∉ V_i do
11:     begin
12:       if V_i [l_ij] + V_i[l_jp_1 ] + ... + V_i[l_p_nm] + V_j[l_mn] < H then
13:       begin
14:         V_i[l_mn] = V_j[l_mn]
15:       end
16:     end
17:   end
18: end
```

Figure 4:
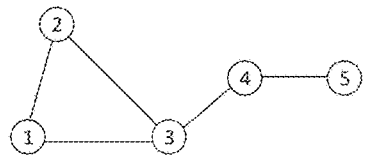
FIG. 4 is an illustration of a global network used to describe the operation of an embodiment of the invention.
Figure 5:
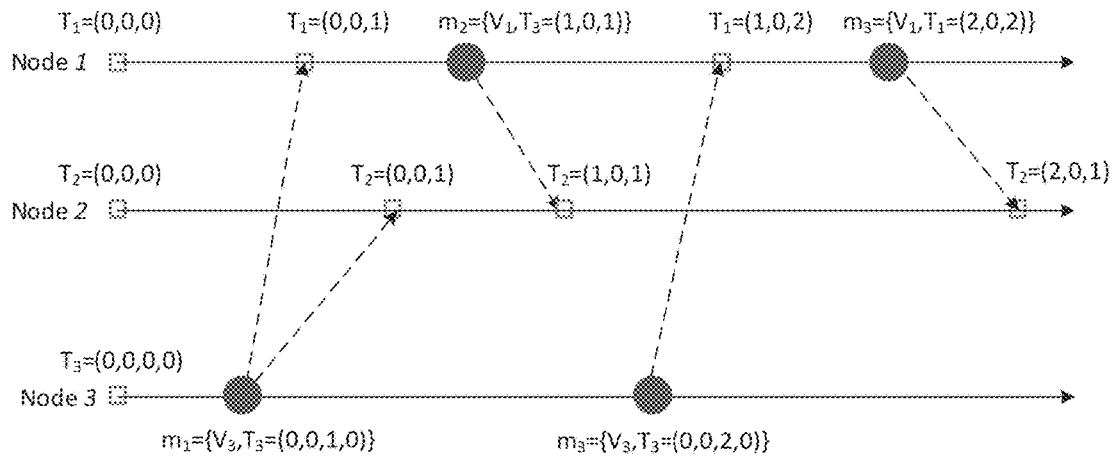
FIG. 5 is an illustration of the exchange of messages between nodes with time used to describe an embodiment of the invention.

A worked example of the topology updating algorithm is now described with reference to the network in FIG. 4.

We assume $r_{adj}=1$ and H=2. Hence, relative to node 1, nodes 2 and 3 are adjacent nodes and nodes 4 and 5 are neighbouring nodes.

At the initial stage, the topological views $V_i$ of nodes 1, 2 and 3, i∈(1,2,3), are:

$$V_1 = \begin{pmatrix} l_{12} = 1 \\ l_{13} = 1 \\ l_{34} = 1 \end{pmatrix}, V_2 = \begin{pmatrix} l_{12} = 1 \\ l_{23} = 1 \end{pmatrix}, V_3 = \begin{pmatrix} l_{13} = 1 \\ l_{23} = 1 \\ l_{12} = 1 \\ l_{34} = 1 \\ l_{45} = 1 \end{pmatrix}$$

As a consequence, node 3 has a main topology view which is more informed and complete than nodes 1 and 2.

Referring back to the method of ordering messages detailing changes, the logical clocks $T_i$ are:

$$T_1 = \begin{pmatrix} t_1 = 0 \\ t_2 = 0 \\ t_3 = 0 \end{pmatrix}, T_2 = \begin{pmatrix} t_1 = 0 \\ t_2 = 0 \\ t_3 = 0 \end{pmatrix}, T_3 = \begin{pmatrix} t_1 = 0 \\ t_2 = 0 \\ t_3 = 0 \\ t_4 = 0 \end{pmatrix}$$

Phase 1:

Node 3 sends the first message $m_1=\{V_3,T_3[t_3]=1\}$ to node 1 and node 2.

Phase 2:

Nodes 1 and 2, that is i∈(1,2), checks if $T_3[t_3]>T_i[t_3]$. As the first message this is the case and so nodes 1 and 2, that is nodes i, update their logical clock $T_i$ and their view $V_i$. In practice this means the addition to $V_1$ of $l_{23}$ as that link was previously unknown to node 1. Whilst link $l_{45}$ was also unknown to node 1, $V_1$ is not updated to include link $l_{45}$ as that link is outside of the allowable neighbour node limit; $l_{13}+l_{34}+l_{45}>H$. The resulting updates to T and V for nodes 1 and 2 are:

$$T_1 = \begin{pmatrix} t_1 = 0 \\ t_2 = 0 \\ t_3 = 1 \end{pmatrix}, T_2 = \begin{pmatrix} t_1 = 0 \\ t_2 = 0 \\ t_3 = 1 \end{pmatrix}, V_1 = \begin{pmatrix} l_{12} = 1 \\ l_{13} = 1 \\ l_{23} = 1 \\ l_{34} = 1 \end{pmatrix}, V_2 = \begin{pmatrix} l_{12} = 1 \\ l_{13} = 1 \\ l_{23} = 1 \\ l_{34} = 1 \end{pmatrix}$$

If node 1 sends a similar message $m_2=\{V_1,T_1[t_1]=1\}$ to node 2, then node 2 updates its logical clock:

$$T_2 = \begin{pmatrix} t_1 = 1 \\ t_2 = 0 \\ t_3 = 1 \end{pmatrix}$$

The topological view $V_2$ for node 2 is unchanged as it already knows about links $l_{12}$, $l_{13}$, $l_{23}$ and $l_{34}$. As there is no change in $V_2$ node 2 does not broadcast a new message.

Phase 3:

The link (edge) $l_{34}$ is now dead. Node 3 detects this change due to a lack of test message from node 4. As a consequence, node 3 updates the view to include that operational status for $l_{34}$. The updated view is:

$$V_3 = \begin{pmatrix} l_{13} = 1 \\ l_{23} = 1 \\ l_{12} = 1 \\ l_{34} = \infty \\ l_{45} = 1 \end{pmatrix}$$

Node 3, because there is a change, sends a new message $m_3=\{V_3,T_3[t_3]=2\}$ to node 1 and node 2. In this example we are assuming that $m_2$ does not reach node 2 (or has not yet reached node 2).

Phase 4:

Node 1 updates its logical clock $T_1$ and its view $V_1$ having performed the checks outlined above. This gives:

$$T_1 = \begin{pmatrix} t_1 = 1 \\ t_2 = 0 \\ t_3 = 2 \end{pmatrix}, V_1 = \begin{pmatrix} l_{12} = 1 \\ l_{13} = 1 \\ l_{23} = 1 \\ l_{34} = \infty \end{pmatrix}$$

Phase 5:

Node 1 acts promptly and sends the message $m_4=\{V_1,T_1[t_1]=2\}$.

Phase 6:

On receiving message $m_4$, node 2 performs the mentioned checks and then node 2 updates $T_2$ and $V_2$ accordingly $$T_2 = \begin{pmatrix} t_1 = 2 \\ t_2 = 0 \\ t_3 = 1 \end{pmatrix}, V_2 = \begin{pmatrix} l_{12} = 1 \\ l_{13} = 1 \\ l_{23} = 1 \\ l_{34} = \infty \end{pmatrix}$$

Further changes would be detected, messaged, ordered and updated in the same manner.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises," and the like, does not exclude the presence of elements or steps other than those listed in any claim or the specification as a whole. In the present specification, "comprises" means "includes or consists of" and "comprising" means "including or consisting of." The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method comprising:
   receiving, by a node in a network, a first message indicating a topology change has occurred in the network, the first message including a received clock value;
   determining, by the node, if the topology change is more recent than a first topology data set associated with at least a first portion of the network by comparing the received clock value to a current clock value of a logical clock;
   if the topology change is not more recent than the first topology data set, advancing, by the node, the current clock value of the logical clock; and
   if the topology change is more recent than the first topology data set:
      advancing, by the node, the current clock value, and updating, by the node, the first topology data set based at least in part on the topology change;
      sending, by the node, a second message to another node in the network, the second message comprising the current clock value and information indicative of the first topology data set; and
      comparing, by the other node as a result of receiving the second message, the current clock value to another clock value associated with another second topology data set representing at least a second portion of the network to determine which of the first and second topology data sets is more recent.

2. The computer-implemented method of claim 1, further comprising:
   receiving, by the node, a plurality of messages from one or more different nodes in the network, the plurality of messages comprising received clock values and associated received topology data sets;
   using, by the node, the received clock values to determine an order of the received topology data sets; and
   updating, by the node, the first topology data set based at least in part on a most recent one of the received topology data sets.

3. The computer-implemented method of claim 1, wherein the information is first information, and the computer-implemented method further comprises:
   detecting, by the node, a particular different node has stopped communicating with the node;
   updating, by the node, the first topology data set to indicate the particular different node has stopped communicating;
   advancing, by the node, the current clock value; and
   sending, by the node, a third message to at least one node in the network, the third message comprising the current clock value and second information indicative of the first topology data set.

4. The computer-implemented method of claim 1, further comprising:
   selecting the other node as a result of the other node being within an adjacency radius or a neighbour radius relative to the node.

5. A system, comprising:
   one or more processors; and
   memory that stores computer-executable instructions that, as a result of execution by the one or more processors, cause the system to:
      receive an update from a node in a network, the update comprising a received topology data set representing a plurality of nodes of the network and a plurality of received time values associated with the plurality of nodes;
      increase a particular local time value of a plurality of local time values in response to receiving the update;
      update any of the plurality of local time values that is less than a corresponding one of the plurality of received time values; and
      if the received topology data set is more recent than a local topology data set, and at least one condition is satisfied:
         update the local topology data set representing at least a second portion of the network based at least in part on the received topology data set, send information indicative of the updated local topology data set to another node of the plurality of nodes, and increase the particular local time value.

6. The system of claim 5, wherein the particular local time value has a previous value before being advanced in response to receiving the update, and the particular local time value is advanced in response to receiving the update by a larger one of the previous value or a corresponding one of the plurality of received time values.

7. The system of claim 5, wherein the particular local time value is increased by a predetermined amount.

8. The system of claim 5, wherein sending the information to the other node causes the other node to advance a time value associated with the other node, change a node topology data set maintained by the other node, and send a message to the system including the time value and identifying a change to the node topology data set, and the computer-executable instructions, as a result of execution by the one or more processors, cause the system to receive the message and increase the particular local time value in response to receiving the message.

9. The system of claim 5, wherein the at least one condition indicates that the received topology data set includes one or more statuses of links not included in the local topology data set.

10. The system of claim 5, wherein the system and the node participate within the network with equivalent privileges or abilities.

11. The system of claim 5, wherein the computer-executable instructions, as a result of execution by the one or more processors, cause the system to determine the received topology data set is more recent than the local topology data set based at least in part on a particular one of the plurality of received time values associated with the node indicating a later time than a particular one of the plurality of local time values associated with the node.

12. A non-transitory computer-readable storage medium comprising executable instructions that, as a result of being executed by one or more processors of a computer system, cause the computer system to at least partially implement a first node in a network to:

receive, by the first node, an update from a second node in the network, the first node comprising a first set of time values and a first topology data set, the update comprising a second set of time values and information indicative of a second topology data set;

update, by the first node, the first topology data set based at least in part on the information to obtain an updated first topology data set if the update indicates that one or more conditions are met;

update any of the first set of time values that is less than a corresponding one of the second set of time values;

advance a first time value of the first set of time values associated with the first node as a result of receiving the update; and if the update indicates that one or more conditions are met, send information indicative of the updated first topology data set to another node in the network, and advance the first time value.

13. The non-transitory computer-readable storage medium of claim 12, wherein at least one of the one or more conditions is met when the information is more recent than the first topology data set.

14. The non-transitory computer-readable storage medium of claim 13, wherein the first node is to determine the information is more recent than the first topology data set based at least in part on a particular one of the second set of time values indicating a later time than a particular one of the first set of time values.

15. The non-transitory computer-readable storage medium of claim 12, wherein at least one of the one or more conditions is met when the information includes one or more statuses of links missing from the first topology data set.

16. The non-transitory computer-readable storage medium of claim 12, wherein at least one of the one or more conditions is met when the information includes a second set of link statuses that differs from a first set of link statuses included in the first topology data set.

17. The non-transitory computer-readable storage medium of claim 12, wherein the first time value has a previous value before being advanced as a result of receiving the update, and the first time value is advanced as a result of receiving the update by a larger one of the previous value or a corresponding one of the second set of time values.

18. The non-transitory computer-readable storage medium of claim 12, wherein the first time value is advanced by a predetermined amount before sending the information.

19. The non-transitory computer-readable storage medium of claim 12, wherein the first topology data set comprises first information associated with one or more nodes of the network within an adjacency radius or a neighbour radius relative to the first node, and the second topology data set comprises second information associated with one or more nodes of the network within the adjacency radius or the neighbour radius relative to the second node.

* * * * *